United States Patent Office 3,729,520
Patented Apr. 24, 1973

3,729,520
PROCESS FOR THE PREPARATION OF UNSATURATED FATTY ALCOHOLS
Horst Rutzen, Dusseldorf-Holthausen, and Wilhelm Rittmeister, Erkrath-Unterbach, Germany, assignors to Henkel & Cie, GmbH, Dusseldorf-Holthausen, Germany
No Drawing. Continuation-in-part of application Ser. No. 561,042, June 28, 1966. This application May 26, 1969, Ser. No. 827,881
Claims priority, application Germany, July 24, 1965, H 56,673
Int. Cl. C07c 29/00, 33/02
U.S. Cl. 260—638 A        8 Claims

ABSTRACT OF THE DISCLOSURE

Process for the preparation of unsaturated fatty alcohols by selective hydrogenation of unsaturated fatty acids and esters thereof with aliphatic alcohols at 250–330° C. and hydrogen pressure of 100–500 atmospheres, the amount of hydrogen being 10–100 Nm.$^3$ per liter of starting material, in presence of zinc-aluminum oxygen containing a catalyst reductively pretreated at elevated temperatures.

REFERENCE TO RELATED APPLICATION

This application is a continuation-in-part of application entitled "Process for the Preparation of Unsaturated Alcohols," bearing a Ser. No. 561,042 which was filed on June 28, 1966, now abandoned.

STATE OF THE ART

The preparation of unsaturated fatty alcohols by high pressure hydrogenation of unsaturated fatty acids and esters thereof in liquid or gaseous phases with specific, selective active catalysts is well known. Ullman's Encyklopädie der technischen Chemie (3rd edition, vol. 7, 1956, page 443), states that the preferred catalysts for this hydrogenation are zinc and cadmium containing catalysts such as zinc carbonates, zinc chromites, zinc vanadate, zinc-cadmium chromite, cadmium-copper carbonate, etc. German Pat. No. 865,741 discloses the preparation of unsaturated fatty alcohols by hydrogenation of unsaturated fatty acids or their esters or anhydrides with mixed catalysts containing vanadate in addition to zinc or cadmium. The said catalysts are formed in the usual manner by stirring zinc oxide or cadmium oxide together with ammonium vanadate in the presence of water, drying the resulting mixture and forming tablets or pellets from the dried powder which are then used for the hydrogenation without further processing. Bertsch et al. in "Fette, Seifen, Anstrichmittel" (vol. 66, 1964, pp. 763–773), have compiled a review of selectively active hydrogenation catalysts and combinations thereof. However, all previously known catalysts have the disadvantage that during the hydrogenation the double bonds of the starting materials are incompletely retained and/or an undesirable transposition of the cis form of the double bonds into the trans form occurs.

OBJECTS OF THE INVENTION

It is an object of the invention to provide a novel processed for the preparation of unsaturated fatty alcohols by selective hydrogenation of unsaturated fatty acids and esters thereof.

It is another object of the invention to provide novel catalysts for the selective hydrogenation of unsaturated fatty acids and esters thereof.

These and other objects and advantages of the invention will become obvious from the following detailed description.

THE INVENTION

The novel process of the invention for the preparation of unsaturated fatty alcohols of 8 to 22 carbon atoms by the continuous selective hydrogenation of unsaturated fatty acids and esters thereof comprises hydrogenating a member selected from the group consisting of unsaturated fatty acids of 8 to 22 carbon atoms and their esters with monovalent aliphatic alcohols of 1 to 18 carbon atoms at temperatures of 250 to 330° C. and a hydrogen pressure of 100 to 500 atmospheres in the presence of zinc-aluminum catalyst which has been pretreated at 400 to 1000° C. in a reducing atmosphere, the amount of hydrogen being 10 to 100 Nm.$^3$ per liter of starting material. The pretreatment of the catalyst is preferably effected at 500 to 900° C.

The hydrogenation of unsaturated fatty acids with a single bond and their esters with the pretreated catalysts of the invention retains not only the double bond but also the cis configuration. The pretreated catalysts of the invention are considerably superior in their selectivity for retaining the double bond to the best known prior art catalysts which are zinc-chromium catalysts which have been pretreated at 280 to 350° C. in a reducing atmosphere. The excellent activity of the catalysts of the invention is all the more unexpected because one skilled in the art would expect the pretreatment at red heat to cause the catalysts to sinter together with a loss of surface area and catalytic activity.

The unsaturated fatty acids of 8 to 22 carbon atoms may be mono- or polyunsaturated and commonly occur in natural fats and oils such as palm kernel oil, palm oil, olive oil, peanut oil, rapeseed oil, etc. Examples of suitable acids are oleic acid, linoleic acid, linolenic acid, ricinoleic acid, $\Delta^9$-decylenic acid, $\Delta^9$-dodecylenic acid, parinaric acid, arachidonic acid, 5-eicosenic acid, etc.

Examples of suitable monovalent aliphatic alcohols of 1 to 18 carbon atoms for esters of the said fatty acids are methanol, ethanol, propanol, isopropanol, butanol, tert.-butanol, hexanol, octanol, decanol, dodecanol, oleyl alcohol, etc. Readily volatile fatty esters of alcohols of 1 to 4 carbon atoms are preferred and particularly the methyl esters are preferred. Mixtures of the unsaturated fatty acids and their esters may be used and saturated fatty acids and esters may also be present therein.

The zinc-aluminum catalysts can be prepared by admixing powdered zinc oxide with an aqueous suspension of amorphous or crystalline aluminum hydroxide or $\gamma$-aluminum oxide. Particularly active catalysts are obtained with freshly precipitated aluminum hydroxide.

For the hydrogenation, the catalysts are preferably used in pellet or tablet form. Therefore, the aqueous paste of the catalyst components is dried and pulverized in the usual manner. If desired, bonding agents such as graphite can be admixed with the catalyst powder and the powder is then pressed into pellets for easy handling.

The pretreatment of the catalysts comprises heating the catalysts at 400 to 1000° C., preferably 500 to 900° C., in a reducing atmosphere for 1 to 10 hours, preferably at atmospheric pressure although pressures above atmospheric pressure may be used. The reducing atmosphere may be any reducing atmosphere such as hydrogen, which is preferred, carbon monoxide or mixture thereof such as water gas. A reducing atmosphere consisting essentially of carbon monoxide and hydrogen can be prepared with methanol vapors.

However, if the same procedure were followed except for the use of the prior art reducing temperatures of 280 to 350° C., the catalysts obtained are less selective in the hydrogenation of the fatty acids and esters thereof with a higher degree of saturation and isomerization of the double bonds. Zinc-aluminum catalysts which are reduced at the low temperatures of the prior art or re-reduced at high temperatures were found to be unsuitable for the preparation of unsaturated fatty acids and esters thereof and result in olefins and only slightly unsaturated fatty alcohols.

A preferred mode of the process of the invention for the preparation of fatty alcohols comprises hydrogenating fatty acids or the esters with monovalent aliphatic alcohols of 1 to 4 carbon atoms, preferably the methyl esters, in the presence of monovalent aliphatic alcohols of 1 to 4 carbon atoms, particularly methanol. With the use of the considerable excess of hydrogen, sufficient addition of aliphatic alcohols of 1 to 4 carbon atoms and the said temperature and pressure conditions, the reaction is substantially effected in the vapor phase when the fatty acid esters of monovalent aliphatic alcohols of 1 to 4 carbon atoms are the starting materials. The result is clear fatty alcohols free from catalyst contamination.

However, difficultly volatile starting materials such as sperm oil can also be hydrogenated with good results. The addition of lower alcohols causes the fatty alcohol to evaporate very rapidly whereby the catalyst is still preserved. The novel advantages of the pretreated catalysts of the invention do not depend upon the concomitant use of aliphatic alcohols of 1 to 4 carbon atoms.

In the following examples there are described several preferred embodiments to illustrate the invention. However, it should be understood that the invention is not intended to be limited to the specific embodiments.

The fatty esters were hydrogenated with catalyst A in a known hydrogenation apparatus consisting of a 1 liter capacity pressure vessel heated to the desired hydrogenation and filled with 800 ml. of the catalyst tablets, water condenser and means for releasing the pressure to separate the hydrogen and to recover the reaction products. The methyl esters to be hydrogenated mixed with methanol in a 1:2 ratio were preheated to about 230° C. and then fed to the pressure vessel at a rate of 200 ml. per hour through a fluid pipe simultaneously with 4 Nm.$^3$ per hour of hydrogen preheated to about 230° C. under 250 atmospheres pressure. After passing through the pressure vessel and the water condenser, the raw hydrogenation mixture was passed to the pressure releasing means where 4 Nm.$^3$ per hour of hydrogen was released and distilled off. The resulting mixture of methanol and unsaturated fatty alcohols were freed of methanol by first distillation at atmospheric pressure and then under water-jet vacuum and the fatty alcohols received were analyzed for the values in Table I.

TABLE I

| Final products | Hydrogenation temperature, ° C. | I.N. | S.N. | Hydroxy number | Solidification point, ° C. | Percent of— | | |
|---|---|---|---|---|---|---|---|---|
| | | | | | | Hydrocarbons | Trans-isomer | Conjugated dienes |
| a. Commercial oleyl alcohol | 276 | 92.6 | 1.3 | 214 | 1 | 0.36 | 6 | 1.21 |
| b. Commercial soya-alcohol mixture | 276 | 140 | 1.4 | 215 | 15 | 0.19 | 11 | 11.5 |
| c. Commercial linseed-alcohol mixture | 283 | 171 | 1.1 | 216 | 15 | 0.22 | 34 | 6.5 |

Table I shows that catalyst A results in unsaturated fatty alcohols having high iodine numbers and a low percent of trans-isomers.

For comparison with prior art catalysts, another portion of the catalyst tablets were reduced with hydrogen in two stages, 280° C. at atmospheric pressures and then at 260 mm. pressure to form catalyst B. A third portion of the catalyst tablets were first sintered at 780° C. in air at atmospheric pressure and reduced as with catalyst B to form catalyst C. The said catalysts were used in the hydrogenation of methyl oleate having an iodine number of 86 at 3 different temperatures and the results are reported in Table II.

TABLE II

| Catalyst | Hydrogenation temperature, ° C, | I.N. | S.N. | Hydroxy number | Solidification point, ° C, | Percent of — | | |
|---|---|---|---|---|---|---|---|---|
| | | | | | | Hydrocarbons | Trans-isomer | Conjugated dienes |
| B | 280 | 90.2 | 5.8 | 84.0 | −3 | 3.6 | 14 | 2.38 |
| | 290 | 92.3 | 6.9 | 59.4 | −4.5 | 7.1 | | 2.0 |
| | 300 | 100 | 2.8 | 39.5 | −7 | 14.5 | 18 | 2.5 |
| C | 280 | 85.1 | 26.8 | 99 | 6 | 3.1 | 26 | 0.66 |
| | 290 | 86.5 | 2.3 | 71 | | 7.4 | 32 | 0.9 |
| | 300 | 90.8 | 1.4 | 81 | 1 | 10.6 | 34 | 8.8 |

Example I 1 kg. of powdery commercial zinc oxide and 1 kg. of amorphous aluminum hydroxide with a loose weight of 520 gm./l. were stirred with water and the resulting powder was vacuum filtered, dried, admixed with 2% by weight of graphite and pressed with 4 mm. tablets. A portion of the tablets were reduced with hydrogen at 730° C. to form catalyst A while passing therethrough a stream of 50 to 200 liters per hour of hydrogen under atmospheric pressure. Catalyst A was used to hydrogenate the following commercial fatty esters: oleic acid-methyl ester, soya-fatty acid-methyl ester, and linseed fatty acid-methyl ester.

The results of Table II show that the catalysts were not effective since aside from some olefinic hydrocarbons, only a little unsaturated fatty alcohol was obtained with either catalyst.

Example II 1 kg. of commercial zinc oxide powder and 1 kg. of crystallized aluminum hydroxide having a loose weight of 1,275 gm. per liter were processed into a catalyst according to the procedure for catalyst A of Example I. The resulting catalyst was used to hydrogenate the starting materials of Example I by the process of the said example. The results are shown in Table III.

TABLE III

| Final products | Hydrogenation temperature, ° C, | I.N. | S.N. | Hydroxy number | Solidification point,° C, | Percent of— | | |
|---|---|---|---|---|---|---|---|---|
| | | | | | | Hydrocarbons | Trans-isomer | Conjugated dienes |
| a. Commercial oleyl alcohol | 283 | 85.4 | 1.3 | 214 | 4 | 0.32 | 5 | 0.85 |
| b. Commercial soya-alcohol mixture | 281 | 144 | 1.3 | 215 | 14.5 | 0.21 | 8 | |
| c. Commercial linseed-alcohol mixture | 290 | 163 | 1.7 | 214 | 13.5 | 0.75 | 33 | |

Example III

Using the procedure of Example I, γ-aluminum oxide and zinc oxide in a 1:2 ration were used to form catalyst tablets reduced in hydrogen at 750° C. The said catalyst was used in the hydrogenation of the fatty acid esters of Table IV to obtain unsaturated fatty alcohols of Table V.

TABLE VI

| Starting material | I.N. | S.N. | Percent of— Hydrocarbons | Trans-isomer | Conjugated dienes |
|---|---|---|---|---|---|
| a. Commercial oleic acid methyl ester | 80 | 191 | 0.20 | 3 | 1.3 |
| b. Commercial soya fatty acid methyl ester | 132 | 192 | 0.05 | 0 | 0.9 |
| c. Commercial linseed fatty acid methyl | 173 | 190 | 0.05 | 11 | 1.6 |

TABLE VII

| Final products | Hydrogenation temperature, °C. | I.N. | S.N. | Hydroxy number | Solidification point, °C. | Percent of— Hydrocarbons | Trans-isomer | Conjugated dienes |
|---|---|---|---|---|---|---|---|---|
| a. Commercial oleic alcohol | 262 | 86.4 | 1.3 | 216 | 3 | 0.33 | 6 | 1.49 |
| b. Commercial soya-alcohol mixture | 262 | 140.3 | 1.6 | 212 | 14 | 0.12 | 8 | 2.9 |
| c. Commercial linseed-alcohol mixture | 272 | 183.5 | 1.4 | 213 | 13.5 | 0.10 | 26 | 4.9 |

TABLE IV

| Starting material | I.N. | S.N. | Percent of— Hydrocarbon | Trans-isomer | Conjugated dienes |
|---|---|---|---|---|---|
| a. Commercial oleic acid methyl ester | 80 | 191 | 0.20 | 3 | 1.3 |
| b. Commercial soya fatty acid methyl ester | 132 | 192 | 0.05 | 0 | 0.9 |

TABLE V

| Final products | Hydrogenation temperature, °C. | I.N. | S.N. | Hydroxy number | Solidification point, °C. | Percent of— Hydrocarbons | Trans-isomer | Conjugated dienes |
|---|---|---|---|---|---|---|---|---|
| a. Commercial oleyl alcohol | 295 | 86.5 | 1.7 | 212 | 3 | 0.45 | 5 | 0.87 |
| b. Commercial soya-alcohol mixture | 295 | 136.2 | 1.6 | 213 | 13.5 | 0.32 | 13 | 3.9 |

Table V shows that catalysts prepared with aluminum oxide at high temperatures give equally satisfactory results.

Examples V to VIII were carried out in an apparatus comprising a furnace of 14 liter capacity and a gas circulation pump. The through-put differed each time and is indicated each time just as the dilution of the oleic acid ester with alcohol is indicated each time. The Zn-Al catalyst was prepared according to Example I-A.

Example V

The starting material was oleic acid methyl ester having an iodine number of 82 and a saponification number of 192. The result are summarized in Table VIII.

TABLE VIII

| Test No. | Through-put, l./h. | Dilution (with methanol) | Hydrogenation temperature, °C. | I.N. | S.N. | Hydroxy number | Solidification point, °C. | Percent of— Hydrocarbons | Conjugated dienes |
|---|---|---|---|---|---|---|---|---|---|
| 1 | 5 | 1:2 | 283 | 88.8 | 1.1 | 212 | 4 | 0.77 | 9 |
| 2 | 3.4 | 1:1 | 276 | 89.2 | 1.2 | 216 | 3 | 0.54 | 10 |
| 3 | 5 | 1:1 | 287 | 89.4 | 1.4 | 216 | 4 | 0.66 | 8 |
| 4 | 1.7 | 1:0 | 278 | 89.2 | 1.2 | 211 | 7 | 1.07 | 12 |
| 5 | 3.5 | 1:0 | 297 | 89.7 | 1.3 | 211 | 5 | 1.57 | 10 |

Example IV 4.26 kg. of $Al_2(SO_4)_3 \cdot 18H_2O$ (chemically pure) were dissolved in 30 liters of water and 7 liters of 10% aqueous ammonia were added with stirring at room temperature. The freshly precipitated aluminum hydroxide was vacuum filtered and was suspended in water together with 1 kg. of commercial zinc oxide. The suspension was washed repeatedly with water until the wash waters were free of sulfate. After drying, the catalyst was put in tablet form and sintered for 2 hours in a hydrogen stream at 750° C. as in Example I. The tablets showed a high mechanical firmness after sintering. The catalysts were used in the hydrogenation of the esters of Table VI using the method of Example I to obtain alcohols of Table VII.

Example VI

Instead of the oleic acid methyl ester used in Example V, an oleic acid ester of isopropanol having an iodine number of 81 and a saponification number of 177 was hydrogenated. The said ester was (1) diluted with methanol at a molar ratio of 1:2; (2) undiluted and (3) diluted with isopropanol at a ratio of 1:2. The results are summarized in Table IX.

TABLE IX

| Through-put, l./h. | Dilution | Hydrogenation temperature, °C. | I.N. | S.N. | Hydroxy number | Solidification point, °C. | Percent of— Hydrocarbons | Trans-isomer |
|---|---|---|---|---|---|---|---|---|
| 5 | 1:2 methanol | 283 | 95.6 | 1.4 | 209 | 2 | 0.39 | 17 |
| 1.7 | 1:0 | 275 | 90.0 | 1.2 | 211 | 4 | 0.49 | 23 |
| 5 | 1:2 isopropanol | 277 | 92.5 | 1.2 | 210 | 3 | 0.62 | 20 |

Examples V and VI show that the selective hydrogenation of the ester group with the catalysts of the invention is successful at varying dilutions with methanol and different throughputs without any essential lessening of quality although as can be seen from the hydrocarbon content lower throughput and dilution with methanol yields a better final product. Example VI also shows that isopropanol esters of unsaturated fatty esters can be selectively hydrogenated with and without diluents.

Example VII

Using the Zn-Al catalyst of Example I-A, free oleic acid having an iodine number of 92 and a saponification number of 205 was selectively hydrogenated with good success as can be seen from Table X.

TABLE X

| Throughput, l./h. | Dilution (methanol) | Hydrogenation temperature, °C. | I.N. | S.N. | Hydroxy Number | Solidification point, °C. | Percent of— | |
|---|---|---|---|---|---|---|---|---|
| | | | | | | | Hydrocarbons | Trans-isomer |
| 5 | 1:2 | 288 | 91.6 | 1.4 | 212 | 1 | 1.57 | 10 |
| 3.4 | 1:1 | 292 | 92.0 | 1.6 | 211 | 1 | 0.66 | 11 |
| 1.7 | 1:0 | 292 | 90.0 | 1.4 | 201 | 4 | 0.98 | 13 |

Example VIII

Sperm oil, an example of esters from fatty acids and long-chain alcohols, was also selectively hydrogenated with the catalyst of Example VII and the results are summarized in the Table XI.

TABLE XI

| | |
|---|---|
| Throughput, l./h. | 4 |
| Dilution (methanol) | 1:3 |
| Hydrogenation temperature, 0° C. | 303 |
| I.N. | 70.2 |
| S.N. | 1.1 |
| Hydroxy number | 218 |
| Solidification point | 17 |
| Percent hydrocarbons | 1.9 |
| Percent trans-isomer | 5 |

The sperm oil had an iodine number of 75.5 and a saponification number of 138 for Table XI.

Various modifications of the catalyst composition and hydrogenation process of the invention may be made without departing from the spirit or scope thereof, and it is to be understood that the invention is to be limited only as defined in the appended claims.

We claim:

1. A process for the preparation of unsaturated fatty alcohols of 8 to 22 carbon atoms which comprises continuously hydrogenating a member selected from the group consisting of unsaturated fatty acids of 8 to 22 carbon atoms and their esters with monovalent aliphatic alcohols of 1 to 18 carbon atoms at temperatures of 250 to 330° C. and a hydrogen pressure of 100 to 500 atmospheres, the amount of hydrogen being 10 to 100 Nm.$^3$ per liter of starting material, in the presence of a zinc-aluminum oxygen-containing catalyst which has been pretreated at 40° to 1000° C. in a reducing atmosphere.

2. The process of claim 1 wherein the alcohol is methanol.

3. The process of claim 1 wherein the starting material is the methyl ester of the unsaturated fatty acids.

4. The process of claim 3 wherein the hydrogenation is effected in the presence of an aliphatic alcohol of 1 to 4 carbon atoms.

5. The process of claim 1 wherein the reducing atmosphere for the pretreatment of the catalyst is selected from the group consisting of hydrogen, carbon monoxide and mixtures of hydrogen and carbon monoxide prepared from methanol vapor.

6. The process of claim 5 wherein the reducing atmosphere is hydrogen.

7. The process of claim 1 wherein the pretreatment of the catalyst is effected at 500 to 900° C. for 1 to 10 hours.

8. The process of claim 1 wherein the catalyst is prepared from freshly precipitated aluminum hydroxide.

References Cited

UNITED STATES PATENTS

| | | | |
|---|---|---|---|
| 1,746,782 | 2/1930 | Lazier | 252—468 |
| 1,900,829 | 3/1933 | Lusby | 252—468 |
| 2,094,127 | 9/1937 | Lazier | 260—638 A |
| 2,205,141 | 6/1940 | Heard | 252—468 |
| 2,239,000 | 4/1941 | Groombridge et al. | 252—468 |
| 2,279,198 | 4/1942 | Huppke | 252—463 |
| 2,512,653 | 6/1950 | Kapecki | 252—468 |
| 2,623,020 | 12/1952 | Gilbert | 252—463 |
| 2,876,265 | 3/1959 | Braconier et al. | 260—638 A |
| 2,960,460 | 11/1960 | Ryes et al. | 252—468 |
| 3,107,146 | 10/1963 | Sauaki | 23—151 |

FOREIGN PATENTS

| | | | |
|---|---|---|---|
| 1,228,603 | 11/1966 | Germany | 260—638 A |
| 1,185,589 | 1/1965 | Germany | 252—463 |
| 558,565 | 6/1958 | Canada | 260—638 A |
| 1,487,277 | 5/1967 | France | 260—638 A |
| 1,111,196 | 4/1968 | Great Britain | 260—638 A |

BERNARD HELFIN, Primary Examiner

J. E. EVANS, Assistant Examiner

U.S. Cl. X.R.

252—463; 260—681, 682